June 26, 1962 D. C. BEATTY 3,041,411

AUTOMATIC, CIRCUIT-CONDITION-CHANGE-RESPONSIVE, ON-OFF CONTROL FOR LOUDSPEAKING TELEPHONE AND THE LIKE

Filed June 10, 1958

2 Sheets-Sheet 1

INVENTOR.

DONALD C. BEATTY

BY

Trachtman & Zoda

ATTORNEYS

June 26, 1962 D. C. BEATTY 3,041,411

AUTOMATIC, CIRCUIT-CONDITION-CHANGE-RESPONSIVE, ON-OFF CONTROL FOR LOUDSPEAKING TELEPHONE AND THE LIKE

Filed June 10, 1958 2 Sheets-Sheet 2

INVENTOR.

DONALD C. BEATTY

BY Trachtman & Zoda

ATTORNEYS

United States Patent Office 3,041,411
Patented June 26, 1962

3,041,411

AUTOMATIC, CIRCUIT-CONDITION-CHANGE-RESPONSIVE, ON-OFF CONTROL FOR LOUD-SPEAKING TELEPHONE AND THE LIKE

Donald C. Beatty, 2800 Overhill Road, Birmingham 9, Ala.

Filed June 10, 1958, Ser. No. 741,091
7 Claims. (Cl. 179—81)

Figure 1:
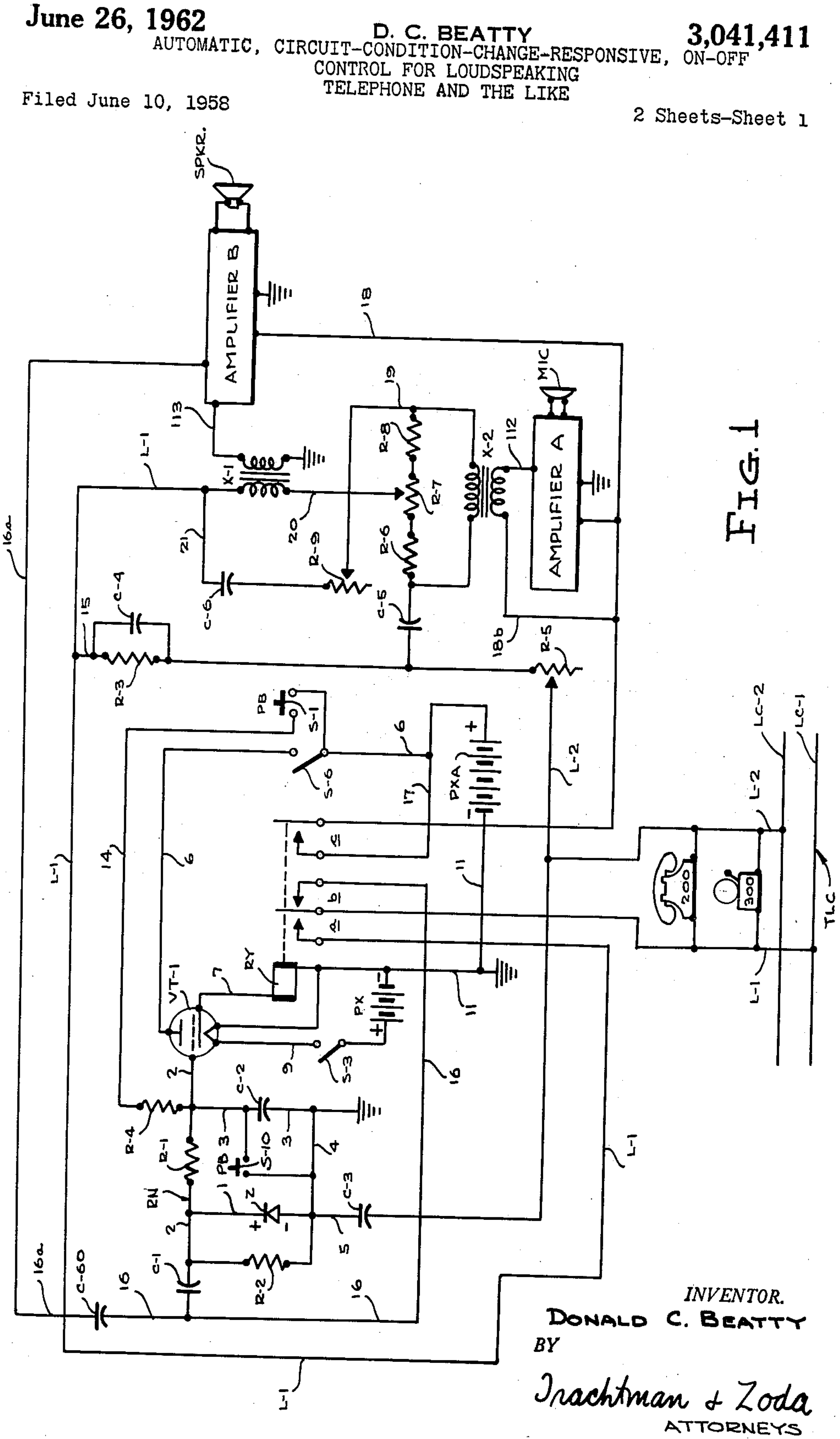

This invention relates to telephonic communications apparatus generally, and more particularly has reference to a novel arrangement of electrical circuits and of electrical circuit components, falling in the general category of structures connectable to telephone loop circuits to discharge the function of receiving and transmitting sounds over said circuits, independently of the ordinary telephone instruments connected in said circuits.

It is of course known to provide electrical devices so designed as to permit one to use, instead of the ordinary telephone instrument of the transmitter-receiver type held up to the ear and mouth, electronic amplification means of sound transmission and reception. Such devices conventionally include a microphone and a speaker, that may be physically located at a substantially greater distance from the mouth and ear, respectively, than the corresponding components of the ordinary telephone instrument. Thus, one seated at a desk may utilize a device supported upon the desk and connected in a telephone loop circuit, for the purpose of carrying on a telephone conversation with another party. The user may speak into and hear sounds emanating from such device, though located a substantial distance therefrom.

As indicated above, devices falling into this general category are broadly old. For example, my Patent No. 2,826,636, issued March 11, 1958, shows an apparatus coming into this general category and adapted particularly for use as a sound amplifying apparatus for telephone and like circuits.

Summarized briefly, the present invention is a generally improved electrical device coupled conductively to an ordinary telephone loop circuit, in which circuit an ordinary telephone instrument may already be connected. A device according to the present invention, when connected in a loop circuit in the indicated manner, is adapted to operate, responsive to the impression of ordinary ringing current on the circuit, to activate the apparatus. Following initial activation of the apparatus in this manner, appropriate components of the device operate to cause the alternating "ringing" current to be replaced by the usual direct current normally employed in telephone circuits as the carrier component for the transmittal of intelligence.

Further summarizing the invention, the apparatus is so designed as to be maintained in the condition last mentioned above for a predetermined period of time, which period begins when either of two occurrences takes place. One of these occurrences or events is the positive termination of the telephone conversation by the calling party. Such termination, of course, is ordinarily produced by return of the calling party's telephone transmitter-receiver to its normal "off" or cradled position. The other event that initiates the mentioned period of time is the ending, that is, the lapse, of a time interval during which sound-carrying electrical surges are not present in the telephone loop circuit to which the invention is connected.

After the passage of the above mentioned, predetermined period of time initiated by occurrence of one of the two events described above, the apparatus comprising the present invention operates to turn itself off and return, as a result, to its normal inoperative, standby condition awaiting its next use.

With the above described, general, overall structural and functional characteristics of the present invention kept in mind, it becomes appropriate to further summarize briefly the apparatus, with reference to more particular or specific components thereof.

Considered from this standpoint, the present invention includes a novel arrangement of electrical circuit components, constituting a generally improved, simplified, and efficiently operating means for activating the device responsive to the impression of ringing current on the associated telephone loop circuit, and for maintaining the apparatus in a condition permitting normal use thereof during the transmission or reception of sounds.

Further, the apparatus includes, as part of the present invention, an improved combination of electrical circuit components that will turn off the machine and return the same to a standby condition, in the particular manner described briefly above in the discussion of the operating characteristics of the device. The turn-off means embodied in the construction comprises a novel combination of a vacuum tube means and a relay means, with a novelly designed receiving amplifier. This combination is such that the mentioned vacuum tube means receives accumulated, rectified current impulses from a final amplifying tube of the receiving amplifier. Said vacuum tube means, under these circumstances, maintains the relay means in an energized condition. The receiving amplifier stops emitting current impulses for transmission to the mentioned vacuum tube means whenever one of the hereinbefore described two events takes place. The vacuum tube means, however, maintains the relay means in an energized condition for the predetermined period of time referred to above, following cessation of the flow of current impulses from the final amplifying tube of the receiving amplifier. Then, current impulses transmitted from the vacuum tube means to the relay means falls below a value sufficient to maintain the relay means in an energized condition. The relay means thus is deenergized and the entire apparatus, as a result, is caused to now return to its inoperative standby condition awaiting its next use.

Further summarizing the invention, the apparatus includes novel receiving and transmitting amplifiers, each of which includes electronic circuit components so arranged as to provide amplification characteristics, with respect to both the received and the transmitted sounds, which characteristics are vastly improved as compared to conventional amplification circuits normally embodied in devices heretofore conceived for the same purpose as the instant apparatus, or for generally analogous purposes. In accordance with the invention, the amplifiers not only amplify an induced sound or electrical wave impulse, but also, as an important feature of the invention, encompass cooperating, interrelated or interlocking means operative to effectively control, in an arranged sequence and timing, the degree of amplification and attenuation of each of the individual amplifiers. In accordance with the invention, the amplifiers are arranged to cooperate with each other in such a way as to individually permit maximum or near maximum amplification of the impressed or induced wave impulses and while so doing, to desensitize or attenuate the amplifier that is not in use at the particular moment, to a degree where the amplifier that is in use will be operable at or near maximum amplification sensitivity without distortion of the amplified signal wave, and without introduction of undesirable extraneous sounds.

The general object or purpose of the present invention.

accordingly, can appropriately be said to be the provision of an apparatus which will have all the desirable structural and functional characteristics discussed above.

Figure 2:
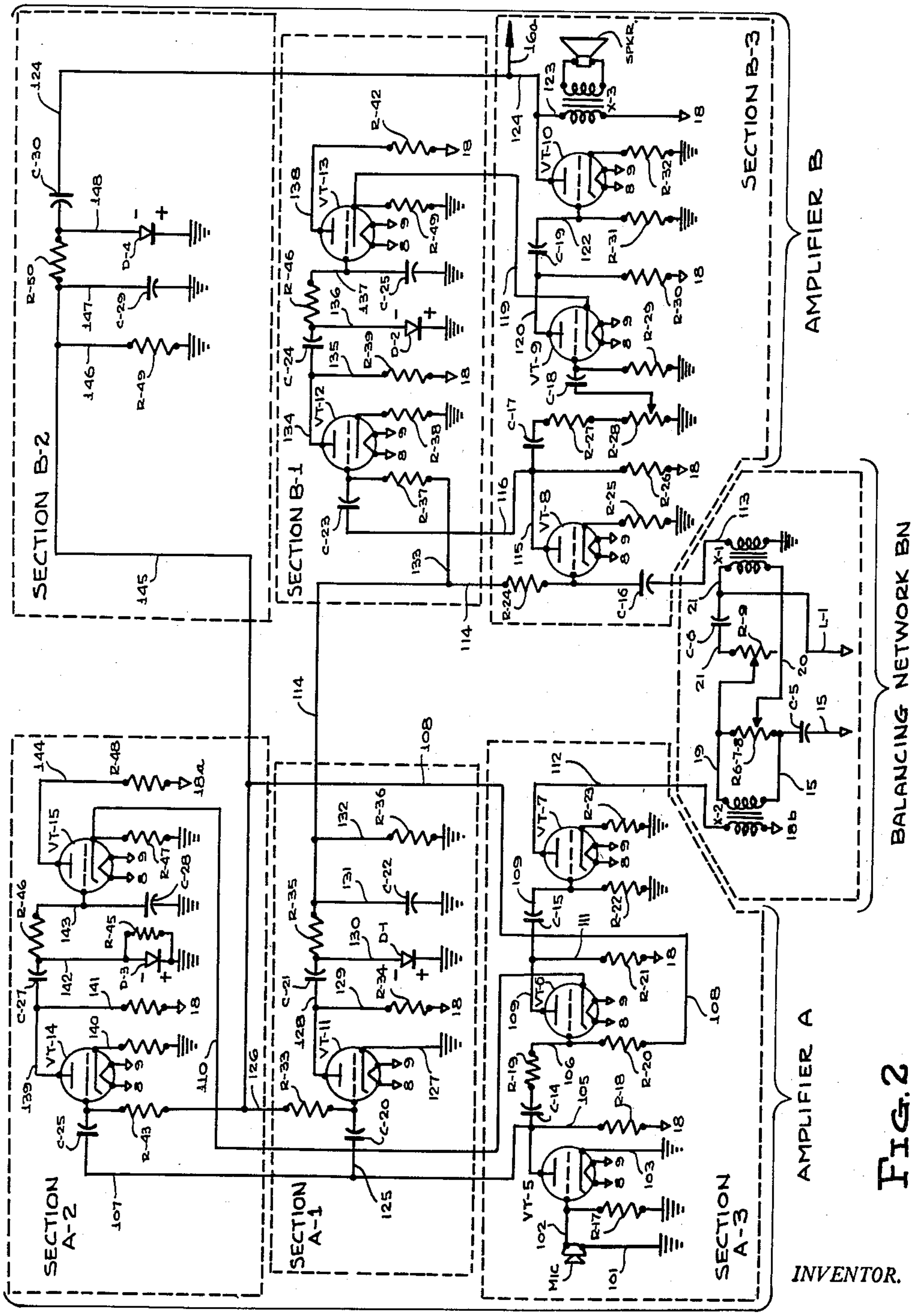

Other objects will appear from the following description, the claims appended thereto, and from the annexed drawings, in which like reference characters designate like parts throughout the several views, and wherein:

FIGURE 1 is a circuit diagram showing apparatus according to the present invention, with the receiving and transmitting amplifiers being illustrated only in block form; and FIGURE 2 is a diagram showing the detailed construction of the receiving and transmitting amplifiers, and showing also the balancing networks by means of which said amplifiers are connected to the remaining circuit components of the present invention.

In the detailed discussion of the present invention that follows herein, it is thought appropriate to describe the apparatus under separate headings. These headings will be as follows: first, The Telephonic Communications Apparatus Generally; and second, The Interconnected Receiving and Transmitting Amplifiers.

*The Telephonic Communications Apparatus Generally*

Circuit configuration of the apparatus, considering the same generally, centers around vacuum tube VT–1, which has ordinary vacuum tube elements including a plate, grid, cathode and filament together with an appropriate electric power supply illustrated as PX and PXA. Other components of arranged electrical values are properly associated with VT–1 in circuit combination to effect the desired result of activating the invention, maintaining the same in an operative condition and finally, returning the invention to an inoperative, standby condition awaiting another sequence of similar activity. The means which I have provided for deactivating the device is caused to become effective, and thus return the invention to its deactivated, inoperative condition, after the lapse of a pre-set period of time throughout which a receiving amplifier B is desensitized and is not functioning as a normal amplifier. In other words, the deactivating means causes the invention to be turned off and to be returned to the standby condition only after passage of a predetermined period of time during which incoming impulses are not effective upon and are not amplified by the amplifier B. The means so provided will be readily apparent by reference to FIGURE 1 and to the following description.

Leads L–1 and L–2 are provided, for connection to conductors LC–1 and LC–2 of an ordinary telephone loop circuit TLC, to which an ordinary telephone and its signal device, diagrammatically illustrated at 200 and 300 respectively, may also be conductively coupled. Now, an intermittent surge of electricity, such as is normally utilized for activating the telephone signal device, is caused to be conducted via the telephone loop circuit to the leads L–1 and L–2 connected thereto. The means, not shown, for initiating the intermittent surge of electricity are those usually provided at a central telephone switching office, also not shown. Beginning with lead L–1, the electrical path followed by such surges may be traced on the drawing as follows: Lead L–1, normally closed switch contacts *b* of relay RY, lead 16, condenser C–1, lead 2, resistor R–1, lead 2 to the grid element of vacuum tube VT–1, lead 3 connected to lead 2, condenser C–2, lead 3 to the common ground; and, from the common ground, the current flow is through lead 4, lead 5, condenser C–3, and lead L–2 to return to telephone loop TLC and complete the closed circuit.

Connected to lead 2 is one terminal of resistor R–2 which has its other terminal connected to the common ground via the lead 4. Lead 1, likewise connected to lead 2, is connected to the positive terminal of rectifier Z which has its negative terminal connected to the common ground via the lead 4.

It will therefore be observed that with switches S–3 and S–6 closed and thus providing tube VT–1 with proper electric power from PX and PXA or from other appropriate source, any intermittent or other surge of current input to the apparatus via the leads L–1 and L–2 will be rectified into positive direct current and subsequently impressed into the grid element of tube VT–1 by the means provided including lead 1, lead 2, resistor R–1 and lead 2.

In reference to this latter occurrence, it is appropriate to state that the electrical values of the cited components have been arranged so that only a limited and predetermined quantity of such positive direct current from each such incoming surge will be immediately impressed into the grid of VT–1. The remaining quantity of such rectified current is utilized as described in the following paragraph.

During the course of the action referred to immediately above, the condensers C–1, C–2 and C–3 become electrostatically "charged." This charge persists in a gradually diminishing quantity for a selected period of time which I have arranged by selection of the electrostatic accumulation and retention values of those condensers. Such a capability is selected to establish the period of time required for the rectified input voltage to be accumulated to a sufficient value so that its effect upon the grid of VT–1 will cause the current consumption of that tube to be greatly increased and to maintain that condition for the selected period of time. As one result of such increased current consumption, the current normally present in the cathode element is ultimately raised to a value required to properly energize the winding of relay RY so as to cause that relay to be activated and to close its switch contacts *a* and *c* and to open its switch contact *b*. In connection with this, it will be observed that the cathode of VT–1 is joined to one terminal of the winding by the lead 7 while the other terminal of that winding is properly connected to the common ground by the lead 11. The relay RY is of a type well known in the art and consists of the winding, a metal frame, and the switch lever configuration illustrated by the drawing.

With the cathode current of VT–1 thus increased to a value to cause activation and operation of relay RY, the condensers C–1, C–2 and C–3 will continue to gradually discharge their accumulated electrostatic charge into the grid of VT–1. The relay winding will thus remain saturated and effective and will hold the switch contacts *a* and *c* closed and *b* open so long as the cathode current output is maintained at a value of not less than that required for the purpose. I have provided such means which I describe hereafter.

The closure of switch contacts *a* with the activation of relay RY severs the connection between the leads 16 and L–1 and places resistor R–3, condenser C–4 and an adjustable portion of resistor R–5 in electrical shunt connection across telephone loop connecting leads L–1 and L–2. The closed circuit so developed may be traced as follows: conductor LC–1 of a normal telephone loop circuit TLC, lead L–1, closed switch contacts *a*, lead L–1, lead 15, resistor R–3 which has in shunt connection therewith the condenser C–4, lead 15, variable resistor R–5, lead L–2 to return to the other side of the telephone loop circuit.

Now by arrangement and through devices at the central telephone office, not shown, a shunt connection across a telephone loop circuit as above described will cause the alternating current ordinarily used for activating the telephone signaling device to be stopped and to thereupon be replaced by the usual direct current normally used over such telephone circuits as the carrier component for the transmittal of intelligence. This direct current voltage is conducted to a balancing or segregating network BN, to be described hereinafter, via the lead L–1 to one terminal of the primary winding of the coupling transformer X–1 of a receiving amplifier B, and from the other terminal of that winding via the balancing network BN, condenser C–5, lead 15, resistor R–5 to the lead L–2. This direct current may in turn be caused to cease flowing upon interruption of the closed electrical circuit which includes the leads L–1 and L–2, for example, as a result of the deenergization of relay winding and the return of relay RY to its deactivated and normal condition with its switch contacts *a* and *c* open and *b* closed.

It will be observed from the foregoing that by selection of the electrical values of the cited components, alternating current flowing to the device over connecting leads L–1 and L–2 will gradually be accumulated as rectified direct current in the rectifying network condensers; that after an arranged period of such accumulation, the same will cause relay RY to become energized and operated and to close its switch contacts *a* and *c* and to open switch contacts *b*; that the winding of relay RY will hold the switch contacts so operated for a preselected period of time, as condensers C–1, C–2 and C–3 gradually discharge their accumulated electrostatic energy into the grid element of VT–1; that during this time and following the closure of switch contacts *a* and *c* and the opening of contacts *b*, the normal "talking" or direct current from the central telephone office, not shown, will be established over the closed electrical circuit to and between the apparatus and said office; and that the conditions above described will persist until caused to cease, as for example, by the opening of the closed electrical circuit which includes the leads L–1 and L–2 or by the deenergization of the relay RY and its return to its normal, deactivated condition.

In order that the invention may function as planned and subsequently be caused to return to the off or standby condition following such use, I have provided means whereby I accomplish the latter objective. By reference again to FIGURE 1, it will be observed that the lead 16 extends to one terminal of condenser C–60 which has its other terminal connected to a lead 16*a* extending therefrom to amplifier B, where it has a connection with the lead 124 (see FIGURE 2), detail connections of the lead 124 being shown in the main by FIGURE 2. By examination of that drawing it will be observed that the lead 124 is connected at one point to the plate element of tube VT–10 which I use as the final output amplifying tube for the incoming amplifier B.

The amplifier B will be fully described hereinafter. At this point, it is sufficient to note that the tube VT–10 responds in a normal manner to all impulses properly input to its grid element from the preceding tube VT–9. These impulses are amplified by tube VT–10 and emitted via its plate element in the form of alternating current of varying amplitude and value, the same being present in the connected lead 124 which likewise conducts the normal direct current supply to the plate of VT–10. The direct current for the plate of tube VT–10 is supplied from source of power PXA, passing through lead 6, lead 17, closed switch contacts *c* of relay RY, lead 18, primary winding of output transformer X–3, lead 123 to the lead 124 and finally to the plate element of tube VT–10. The above mentioned condenser C–60 is arranged in series connection with the lead 16 and lead 16*a*, and is so provided to serve as a blocking condenser to prevent passage of all direct current from the plate of VT–10 to the grid rectifying and storage network provided for tube VT–1. The alternating current component of the plate emission currents from tube VT–10 is not so blocked and is readily transmitted by the condenser C–60 from the lead 16*a* to the lead 16, condenser C–1, lead 2 and therefrom to the other elements comprising the grid rectifying and storage network RN provided for VT–1.

As previously described, an intermittent surge of current input to the invention by the means provided will be rectified into positive direct current and subsequently accumulated and impressed into the grid element of VT–1 so as to cause the ultimate energization and operation of relay RY. It is pointed out that because of the arranged electrostatic accumulation and retention values of condensers C–1, C–2 and C–3, whenever the relay RY is once energized and operated such a condition will persist until the accumulated positive current flowing from those condensers has fallen to a value too small to be sufficiently effective upon the grid of VT–1 so as to maintain RY energized and operated.

During all times when amplifier B is functioning as a normal amplifier responsive to electrical surges properly input thereto, the final amplifying tube VT–10 is emitting alternating currents of varying amplitudes and value from its plate to the connecting lead 124. Such currents are accumulated, rectified and become effective upon the grid element of VT–1 as previously described. It will therefore be understood that the alternating currents emitted by VT–10 are and will continue to be so accumulated and effective so long as the same are emitted. Therefore, the relay RY will be maintained in an energized and operated condition for an arranged period of time following the last input of such current from VT–10.

The apparatus will therefore be maintained in an energized and operated condition for a predetermined and arranged period of time following the cessation of sound-carrying electrical surges that are flowing into the apparatus and in particular into amplifier B, that is, surges that are being input from the telephone loop circuit. On expiration of the arranged period of time that follows cessation of such surges, the accumulated direct current in the condensers C–1, C–2 and C–3 falls below the value established as necessary to maintain relay RY energized and operated. When such an event occurs, the relay RY returns to its normal deactivated condition and the switch contacts *a* and *c* open and *b* close. The invention is therefore returned to its off or standby condition, awaiting a subsequent activation.

Manual push button PB of switch S–1 has been provided to enable instant activation of the invention simply by momentarily closing the said switch. When this is done, positive direct current of proper value is conducted from the positive terminal of PXA through lead 6, closed switch S–1, lead 14, resistor R–4, lead 2 to the grid element of VT–1, and is also conducted via lead 3 to one terminal of condenser C–2 and from the other terminal of that condenser via lead 3 to the common ground, to return to the negative terminal of PXA to complete the closed circuit. The application of such positive current in the manner described will result in the proper electrostatic charging of condenser C–2 and the instant response of tube VT–1 so as to immediately cause the energization and operation of relay RY.

In simple words, the invention is caused to become activated when a caller places a telephone call to the telephone loop circuit to which the same is connected. When so activated, the invention will continue to be maintained in that condition until the expiration of an arranged period of time after the caller returns his telephone microphone-receiver instrument to its normal off or cradled position, that is, until the lapse of a predetermined period of time during which sound carrying electrical surges are not present in the telephone loop circuit to which the invention may be connected so as to be effective upon the amplifier B.

A manual turn-off is also incorporated in the apparatus. Connected between leads 3 and 4 is a push button switch S–10. This places a shunt connection to ground across condenser C–2 which instantly turns the unit off by discharging the electrostatic charge of condenser C–2 and grounding the grid of tube VT–1.

While the foregoing describes the preferred manner of effecting a turn-off of the invention and causing its return to an inoperative and standby condition, other less desirable means have been arranged during the course of development of the device. To cite one such other means, an ordinary relay switch may be utilized, having its field coil winding connected in series with the lead 16*a*. The normally open switch contacts of the said relay may be substituted for the previously described manually operable switch S–1 and thus provide appropriate current for the energization of relay RY in the manner described. The field coil winding of the said relay would be energized to cause the operation of relay RY, in response to current surges emanating from the plate of VT–10 as likewise previously described.

*The Interconnected Receiving and Transmitting Amplifiers*

In the general discussion of the apparatus which has been provided above, there has been no attempt to describe the detailed construction and operation of the receiving and transmitting amplifiers A and B. Further, there has been no attempt to describe the particular relationship of these amplifiers to each other and to the balancing network BN with which they are closely associated. Rather, up to this point I have been concerned mainly with describing the manner in which the apparatus is activated responsive to the impression of ringing current surges on the telephone loop circuit TLC; the manner in which the device is maintained in operating condition during normal use thereof; and the manner in which the device is caused to return to a standby condition, with said return to a standby condition being delayed for a predetermined period of time following the cessation of sound carrying electrical surges in the telephone loop circuit.

With an understanding of the operational characteristics of the complete apparatus, it is appropriate to pass now to a detailed discussion of the receiving and transmitting amplifiers.

Ordinary sound wave vacuum tube amplifiers are old in the art per se. Such devices are usually designed for the straightforward amplification of an electrical impulse, induced or otherwise. In contrast, I have provided the novel transmitting amplifier A and receiving amplifier B. These not only amplify an induced sound or electrical wave impulse but they also encompass cooperating cross-related and interlocking means to effectively control, in an arranged sequence and timing, the degree of amplification and attenuation of each of the individual amplifiers A and B.

The purpose of such a novel arrangement as outlined above is readily apparent when one considers that it is desirable at times to have such sound wave vacuum tube amplifiers capable of operating at or near maximum amplification sensitivity without distortion of the amplified signal wave and/or without introducing other undesirable extraneous sounds. The FIGURE 2 circuit arrangement which I have provided accomplishes that objective. By the means disclosed, the amplifiers A and B are arranged to cooperate with each other so as to individually permit maximum or near maximum amplification of the impressed or induced wave impulse and while so doing, to desensitize or attenuate the alternate amplifier to a degree where such amplification will not occur.

The amplifiers A and B are individually arranged to function as efficient amplifiers only so long as the alternate amplifier is effectively attenuated. Each amplifier is provided with its own cooperating means to accomplish the attenuation of the alternate amplifier. Each amplifier is likewise provided with its own automatic amplification gain control which, for the amplifier B, is activated by the input or an impulse thereto from the balancing network BN and transformer X–1. The amplification gain control provided for the amplifier A is arranged to be operative only upon input to that amplifier, via microphone MIC, of sound waves having a magnitude greater than an arranged minimum value.

The novel arrangement of elements comprising the amplifiers A and B is illustrated in FIGURE 2. This schematic drawing has been sectionalized for description clarity and reference. By reference to FIGURE 2, it will be observed that one of its seven sections is the balancing network BN. This network is one and the same as illustrated and described as a part of FIGURE 1. It is shown in FIGURE 2 to aid in continuity of the description thereof. The remaining six sections of FIGURE 2 depict other principal interrelated circuits which are integral parts of the amplifiers A and B.

The seven sections shown in FIGURE 2 are as follows:

*Balancing network.*—This network is arranged to provide cooperation between elements of the invention and the telephone loop circuit TLC.

*Section A–1.*—This portion of amplifier A is provided to accomplish attenuation of the amplifier B, through its gain control section B–1. It also attenuates tube VT–8 via the grid of that tube (see section B–3, to be described hereinafter).

*Section B–1.*—This combination of elements in circuit comprises the gain control section of the incoming amplifier B.

*Section A–2.*—This combination of elements in circuit comprises the gain control section of outgoing amplifier A.

*Section B–2.*—This section of amplifier B is an attenuation section designed to produce, in an arranged sequence and timing, a desired attenuation of the sensitivity of outgoing amplifier A, the incoming amplifier B attenuating means illustrated as section A–1, and the outgoing amplification gain control means depicted as section A–2.

*Section A–3.*—This is the outgoing sound amplification section, amplifier A.

*Section B–3.*—This is the incoming sound amplification section, amplifier B.

The balancing network will be first described and is very similar to that specified in Patent No. 2,786,099, issued to me on March 19, 1957. By this arrangement of components of correct electrical values electrical/acoustical feedback typified by loudspeaker "howl" is eliminated. This is so because electrical impulses invariably attempt to follow paths of the least electrical resistance. For example, outgoing electrical impulses from amplifier A follow such a path of minimum electrical resistance. These impulses (see FIGURE 1) are induced into the secondary winding of coupling transformer X–2 from the primary winding and flow from one terminal of the secondary winding via lead 15, condenser C–5, lead 15, variable resistor R–5, and lead L–2 to one side of the telephone loop circuit, and, from the other side of the telephone loop circuit via lead L–1, closed contacts *a* of relay RY, lead L–1, lead 21, condenser C–6, lead 21, resistor R–9, and lead 19 to the other terminal of the secondary winding of transformer X–2.

This path offers a lesser amount of electrical resistance than the path which includes the greater resistance represented by resistors R–6, R–7, R–8 and the primary winding of transformer X–1. This is an important reason, aided by the resultant impedance balancing between the cited circuit components and the telephone loop circuit, why the output of outgoing amplifier A is not induced into the secondary winding of transformer X–1, amplified by incoming amplifier B and emitted in the form of loudspeaker "howl" from speaker SPKR. As microphone MIC and speaker SPKR are within the acoustical range of each other any such emission would be picked up by microphone MIC, and emitted by speaker SPKR in a continuous repetitive manner. The resistor R–5 is arranged to vary the total over-all balancing circuit/telephone loop circuit resistance in arranging electrical harmony between the two. Phase 2 of Patent No. 2,786,099 may be referred to for further definitive data on this aspect.

Functioning of the amplifiers A and B may be readily understood by reference again to FIGURE 2 and to the description which follows.

Considering first the amplifier A, with appropriate electric power connected in a normal manner to all vacuum tube filament and plate elements of the invention, a sound wave impulse picked up by microphone MIC of outgoing amplification section A–3 will be impressed as an electrical impulse via lead 102 into the grid element of tube VT–5. The grid of that tube is connected to common ground by resistor R–17 thus permitting the impulse to be amplified as designed and subsequently emitted via the plate element of tube VT–5 to the connecting lead 104. Connected to lead 104 is lead 107 which has connected to it the lead 125. The lead 125 has condenser C–20 of the attenuation section A–1 connected in series therewith and then continues to a joint connection with resistor R–33 and the grid element of tube VT–11. Being connected by resistor R–33 to the common ground via leads 126, 145, 146 and resistor R–49, the tube VT–11 amplifies the impressed impulse, and emits it via its plate element to the connecting lead 128. The lead 128 has blocking condenser C–21 connected in series therewith and then continues to a joint connection with one terminal of resistor R–35 and, via lead 130, to the negative terminal of rectifier D–1, the other or positive terminal of rectifier D–1 being connected to the common ground.

To the other terminal of resistor R–35 is connected the lead 114 to which is connected leads 131 and 132. Lead 131 has condenser C–22 inserted in series connection and lead 132 has resistor R–36 inserted in series connection before both leads terminate in a connection with the common ground. The elements C–22 and R–36 function in part as a filter network for the rectifier D–1. The impulses emitted by the plate element of tube VT–11 are thus rectified to impulses of large negative value by rectifier D–1 and travel simultaneously, via leads 114 and 133, to one terminal of grid resistor R–37 (for tube VT–12) and to one terminal of grid resistor R–24 (for tube VT–8). The other terminal of each of said grid resistors is connected to the grid element of the associated tube, with the result that the negative impulses from rectifier D–1 are impressed into the grid elements of tubes VT–12 and VT–8. As is well known, such a negative voltage into the grid element of such a vacuum tube brings about a prompt disabled and non-conducting condition of the tube.

From the foregoing it will be seen that a sound impulse, when effective upon MIC, amplified by tubes VT–5 and VT–11, and rectified into electrical impulses of high negative value by rectifier D–1, will render the tubes VT–8 and VT–12 simultaneously ineffective and non-conducting. Such an occurrence thus disables and prevents the normal functioning of sections B–1 and B–3 of amplifier B. Any impulse incoming to amplifier B via the balancing network circuits and coupling transformer X–1 will therefore be ineffective upon and will not be received and amplified by amplifier B during such a period.

The lead 107 continues from its junction with lead 125 to one terminal of condenser C–26 of outgoing gain control section A–2. Condenser C–26 has its other terminal connected to the grid element of tube VT–14. An impulse amplified by tube VT–5 is therefore simultaneously transmitted to tubes VT–11 and VT–14. The grid-to-ground arrangement for tube VT–14 is provided by resistor R–43, lead 126, leads 145 and 146, and by resistor R–49. With an impulse from tube VT–5 impressed into the grid of tube VT–14, the said impulse is again amplified and emitted via the plate element of that tube to the connecting lead 139. The lead 139 has blocking condenser C–27 connected in series therewith and then continues on to a joint connection with one terminal of resistor R–46 and, via lead 142, to the negative terminal of rectifier D–3, the other or positive terminal of D–3 being connected to the common ground. In shunt connection across rectifier D–3 is the resistor R–45 which, with condenser C–28, forms in part the filter network for rectifier D–3. The other terminal of resistor R–46 is connected to lead 143 which is also connected to the grid element of tube VT–15 and to one terminal of condenser C–28, previously mentioned. The other terminal of condenser C–28 is connected to the common ground. The plate element of tube VT–15 is appropriately connected with the power supply PXA, via the lead 144, the series-connected resistor R–48 (see FIGURE 2), a lead 18*a*, and lead 18 (see FIGURE 1).

In reference to the tube VT–15, it is important to note that its cathode element is connected to the common ground via the series-connected resistor R–47. The electrical value of resistor R–47 is arranged for the biasing of tube VT–15 to a degree whereby the resultant voltage flowing from its cathode element will be greater than the normal biasing voltage for tube VT–6, the same being arranged to be near the cutoff or non-conducting edge value for that tube. The cathode of tube VT–6 is connected with the cathode element of tube VT–15 by the lead 110. The purpose of this is to maintain tube VT–6 in a rear cutoff and semi-conducting condition at all times except when sound waves are effective upon microphone MIC, amplified as electrical impulses by tubes VT–5 and VT–14, rectified as described by rectifier D–3 and subsequently made effective upon tube VT–15. It is appropriate to state that the grid-to-ground connection for tube VT–15 is via lead 143, resistor R–46, lead 142 and resistor R–45 to the common ground.

When a sound wave of sufficient magnitude is effective upon microphone MIC and amplified as above set forth, the amplified impulses are thereupon effective upon the grid element of tube VT–15 in the form of high negative voltage impulses. The result of this is to immediately force tube VT–15 into a condition whereby there is a resultant decrease in its current consumption and a decrease in the voltage flowing from its cathode. The amount of decrease of the cathode voltage is arranged so that the remaining voltage flowing therefrom will be correct and proper for the efficient biasing of tube VT–6. This biasing is accomplished by the lead 110 connecting the cathodes of those two tubes together and to one terminal of resistor R–47, the other terminal of which is connected to the common ground and, by the grid-to-ground arrangement for tube VT–6 provided via lead 106, resistor R–20, lead 108, lead 145, lead 146 and resistor R–49 to the common ground.

With the proper biasing of tube VT–6 established as above described, that tube immediately functions as an efficient amplifier. The tube will continue to so function as long as tube VT–15 remains in a condition as above described, for example, when a sound wave of greater magnitude than an arranged minimum is effective upon microphone MIC. Tube VT–6 reverts to a near cutoff or non-conducting condition promptly with return of tube VT–15 to its arranged normal operating condition, i.e., high cathode voltage.

Now, with the tube VT–6 restored to an efficient amplifier as described above, sound waves in the form of electrical impulses impressed into its grid will be amplified in a normal manner and emitted via its plate to the connecting lead 109. Such impulses are those previously described as being effective upon microphone MIC, amplified by tube VT–5 and carried to the grid of tube VT–6 via lead 104 to which is connected in series the condenser C–14, resistor R–19 and lead 106, which in turn is connected to the grid of tube VT–6. The impulses thus emitted from the plate of tube VT–6 are carried via the connecting lead 109 through the series-connected condenser C–15 to the grid element of tube VT–7. Likewise connected with that grid is the resistor R–22 which has its other terminal connected with the common ground.

The tube VT–7 is properly biased by the resistor R–23 connected between its cathode and the common ground. Impulses so impressed into the grid of tube VT–7 are therefore amplified in a normal manner and are subsequently emitted via its plate into the lead 112 to one terminal of the primary winding of coupling transformer X–2. The other terminal of that winding is connected to the previously mentioned power supply via leads 18*b* and 18, switch contacts c of relay RY, lead 17 and the lead 6 as depicted by FIGURE 1.

Any impulse thus impressed into the primary winding of transformer X–2 of the balancing network is transmitted by induction into the secondary winding of that transformer and thence, as previously described, into the telephone loop circuit TLC.

Amplifier A has been arranged to provide the required amount of amplification of any sound impulse properly effective upon microphone MIC so as to enable its reception in a clear and loud manner at the distant associated telephone or other device, not shown. Because of its increased magnitude, a small portion of such an amplified impulse may be induced into the secondary winding of coupling transformer X–1 and thence conducted via lead 113 and series-connected condenser C–16 to the grid of tube VT–8. By the means provided, however, such an impulse will not be effective upon tube VT–8, nor will the tube VT–8 respond thereto. This is so because both tubes VT–8 and VT–12 are, at that instant, disabled and non-conducting as described above. This being so, the amplifier B cannot then function as a normal amplifier and neither distortion nor extraneous signals or other sound can be emitted via its loudspeaker SPKR.

From the foregoing description it will be seen that when impulses are effective upon microphone MIC and amplified with great magnitude by section A–3 of amplifier A, the same will be induced into the balancing network BN and carried therefrom via the described means to a telephone circuit to which the invention may be connected; that simultaneously with the amplification of the impulse effective upon microphone MIC, the amplifier B is disabled and made inoperative as such by provided means in the form of section A–1 of the amplifier A, and, while so disabled the amplifier B cannot respond to any impulse which may be conducted thereto by means provided. In other words, the amplifier B cannot function as an amplifier while the amplifier A is so functioning.

As in the case of amplifier A, the amplifier B is basically a three-stage amplifier of electrical impulses input to the grid element of its first amplifying tube. The amplifier B likewise has associated and controlling means which provides amplification gain control for that amplifier as well as means for the attenuation of the amplifier A. The description which follows will make this apparent.

As previously described, the amplifier B has been provided to amplify electrical impulses incoming from the telephone circuit TLC, and to emit the same in the form of sound waves from loudspeaker SPKR. Such impulses are transmitted to amplifier B by means previously described which include the balancing network and the primary winding of its associated transformer X–1. The description of the amplifier B construction and operation will therefore begin with the secondary winding of coupling transformer X–1.

Electrical impulses induced into the secondary winding of transformer X–1 from the primary winding thereof are conducted to the incoming amplification section B–3, passing to the grid element of tube VT–8 via lead 113 and the condenser C–16 connected in series therewith. One terminal of the secondary winding of X–1 is connected to the common ground while the other is connected to the lead 113. The tube VT–8 is properly biased by the resistor R–25 connected between its cathode and the common ground and is provided with a correct grid-to-ground arrangement via resistor R–24, lead 114 and lead 132, which is connected to the common ground via resistor R–36. Tube VT–8 is also provided with appropriate electric power and therefore the impulses so input to its grid are amplified and emitted via the plate element to the connecting lead 115. The lead 116, connected to the lead 115, extends via the series-connected condenser C–23 to a connection with the grid element of tube VT–12, as illustrated in section B–1.

The means illustrated in section B–1 functions for section B–3 via tube VT–9 in a manner identical to the functioning of section A–1 for section A–3 of the amplifier A via tube VT–6. In other words, section B–1 provides the required amplification gain control for the amplifier B.

Returning to consideration of tube VT–12, it will be observed that that tube is properly biased by the resistor R–38 connected between its cathode and the common ground. The tube is likewise provided with appropriate electric power, by means previously described, and via the lead 134, lead 135, resistor R–39, and lead 18, for its plate element. With an impulse from tube VT–8 impressed into the grid of VT–12, the said impulse is again amplified and emitted from the plate element of that tube to the connecting lead 134. The lead 134 has the blocking condenser C–24 connected in series and then continues to a joint connection with one terminal of resistor R–40 and by lead 136 to the negative terminal of rectifier D–2, the other or positive terminal of D–2 being connected to the common ground. The other terminal of resistor R–40 is connected to lead 137 which is connected to the grid element of tube VT–13 and to one terminal of condenser C–25. The other terminal of condenser C–25 is connected to the common ground. Condenser C–25 acts in part as a filter for the rectifier D–2. The plate element of tube VT–13 is appropriately connected via lead 138 and resistor R–42 with the power supply previously referred to. The grid-to-ground arrangement of tube VT–13 is provided via lead 137, resistor R–40, lead 136 and rectifier D–2.

As in the case of tube VT–15, it is important to note that the cathode element of VT–13 has the resistor R–41 connected between it and the common ground. The electrical value of R–41 is arranged for the biasing of tube VT–13 to a degree whereby the resultant voltage flowing from its cathode element will be greater than the normal voltage required for the tube VT–9, the same being arranged to be at a value near the cutoff or non-conducting condition for that tube. The cathode of tube VT–9 is connected with the cathode element of tube VT–13 by the lead 119. The purpose of this is to maintain tube VT–9 in an ineffective and non-conducting condition at all times except when an electrical impulse is properly effective upon and is amplified by tube VT–8. Such a condition is arranged to occur upon the impression into the grid element of VT–8 of any proper electrical impulse input thereto by the means provided from a telephone circuit, not shown, to which the invention may be connected. At all other times, including those times when sound waves or other impulses are effective upon microphone MIC and are subsequently amplified by amplifier A, the tube VT–9 is arranged to remain in an ineffective and non-conducting condition.

When electrical impulses are amplified by tube VT–8 these impulses are impressed into the grid of tube VT–12 by means provided and are again amplified by that tube and emitted by its plate to the connecting lead 134. The associated elements, via: C–24, D–2, R–40, and C–25 are arranged to rectify such impulses into those of a high negative voltage value and to impress the same into the grid element of tube VT–13 via the lead 137. The result of this is to immediately force tube VT–13 into a condition whereby there is a resultant decrease in its current consumption and in the voltage flowing from its cathode. The amount of decrease of the cathode voltage is arranged so that the remaining voltage flowing therefrom will be correct and proper for the efficient biasing of tube VT–9. This biasing is accomplished by the lead 119 connecting the cathodes of tubes VT–13 and VT–9 together and to one terminal of resistor R–41, the other terminal of which is connected to the common ground. The resistor R–29 provides the proper grid-to-ground arrangement for tube VT–9. Appropriate power, previously described, is input to the plate element of tube VT–9 by the series-connected resistor R–30 and the leads 121 and 120.

With the proper biasing of tube VT–9 arranged as above described, that tube immediately functions as an efficient amplifier. The tube VT–9 will continue to so function as long as tube VT–13 remains in a condition as above described, as for example, when the tube VT–12 amplifies an impulse carried to its grid from the tube VT–8 by means provided. The tube VT–9 reverts to a near cutoff or non-conducting condition promptly with the return of VT–13 to its arranged normal operating condition, i.e., high cathode voltage.

With the tube VT–9 restored to an efficient amplifier as described above, electrical impulses impressed into its grid will be amplified in a normal manner and emitted via its plate element to the connecting lead 120. Such impulses are those previously described as emanating from the plate element of tube VT–8 to the connecting lead 115, series-connected condenser C–17, resistor R–27, to one side of volume control resistor R–28, the other side of which is connected with the common ground, and from the variable slider connection of volume control resistor R–28, lead 118, series-connected condenser C–18 to the grid of tube VT–9. A proper grid-to-ground arrangement is provided by resistor R–29 which is connected between the grid of tube VT–9 and the common ground.

Impulses amplified by tube VT–9 and emitted via its plate element to the connecting lead 120 are conducted to the grid element of tube VT–10 via the series-connected condenser C–19 and the lead 122. From its connection with the grid, lead 122 continues to the common ground via the resistor R–31, the latter providing the proper grid-to-ground arrangement for tube VT–10. Proper biasing for the tube is provided by the resistor R–32 connected between the cathode and the common ground. Appropriate power is provided the tube via its plate from the connecting leads 124 and 123 to one terminal of the primary winding output of coupling transformer X–3 and from the other terminal of that winding via lead 18, to the source of power along a path previously described.

Any impulse thus carried to the grid of tube VT–10 will be amplified by that tube in the arranged manner and emitted via its plate to the connecting lead 124 and to one terminal of the primary winding of output coupling transformer X–3. The other terminal of that winding is connected with the local power supply, previously described. Thus any impulse emitted by tube VT–10 will be promptly present in the primary winding of transformer X–3, induced into the secondary winding thereof and subsequently emitted via the loudspeaker SPKR connected thereto.

The foregoing describes how sound, in the form of electrical impulses input to the invention via the telephone loop circuit TLC will be amplified by section B–3 of the amplifier B and emitted in the form of sound waves by the loudspeaker SPKR.

Now as an important element of the amplifier B circuitry, I have provided cooperating means for attenuation of the transmitting amplifier A during periods when the receiving amplifier B is operating to receive, amplify and emit from speaker SPKR the above mentioned impulses from the telephone loop circuit. The means so provided is illustrated as section B–2 and is described below.

With the amplification of impulses by tubes VT–8, VT–9 and VT–10, the same are emitted via the plate of tube VT–10 to the connecting lead 124 as above described. In addition to being carried to transformer X–3 via lead 123, these impulses are conducted via lead 124 to the section B–2 elements, the first of which is the series-connected condenser C–30. The other terminal of condenser C–30 is connected to one terminal of resistor R–50 and to lead 148. Lead 148 extends to the negative terminal of rectifier D–4 which has its positive terminal connected to the common ground. The other terminal of resistor R–50 is jointly connected to leads 147, 146 and 145, with the lead 147 being connected to one terminal of series-connected condenser C–29, the other terminal of which is connected to the common ground. The lead 145 is jointly connected to one terminal of grid resistors R–20 of tube VT–6, R–33 of VT–11 and R–43 of VT–14 via the connecting leads 108, 106 and 126.

The foregoing means is arranged to rectify into a high negative value any electrical impulse emitted by tube VT–10 and carried to the section B–2 means via lead 124. The purpose of this is to provide required attenuation of the transmitting amplifier A by application of said negative voltage to the grid elements of tubes VT–6, VT–11 and VT–14 during those arranged periods when the receiving amplifier B is functioning as such. The application of high negative voltage to the grids of such amplifying tubes will immediately force the same into an ineffective and non-conducting condition.

The section B–2 attenuation means cooperates with and functions for the amplifier B in a manner identical to the functioning of the section A–1 means for the amplifier A. In other words, section A–1 attenuates the incoming or receiving amplifier B and section B–2 attenuates the outgoing or transmitting amplifier A. Correct sequencing of this attenuation is arranged by the means provided.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any change in construction that may be permitted within the scope of the appended claims.

Having thus described my invention, I claim as new, and desire to protect by Letters Patent:

1. In a loudspeaking telephone the combination, with a telephone loop circuit, a transmitting and a receiving amplifier, and a signal voltage transmission system common to both amplifiers and interconnecting the respective amplifiers with said circuit, of an automatic on-off control responsive automatically to changes in circuit conditions, said control comprising: an electromagnetic winding and a vacuum tube having a cathode the output of which is impressed upon the winding through a connecting lead to energize the winding; a set of normally open contacts connected in said system and closing responsive to energization of the winding to permit signal voltage flow through the system between the loop circuit and amplifiers, one of said amplifiers including an amplifying tube having a plate responsive to the presence of signal voltage in the transmission system and in said one amplifier to produce a control current separate and apart from the signal voltage; a rectifying network having an input side conductively coupled to said plate for conduction of the control current from the amplifying tube to the rectifying network, said network being operative to rectify, store, and thereafter impress upon the first tube the control current produced by the amplifying tube, so as to bias the first tube and produce said cathodic output of the first tube for a predetermined time period following cessation of said signal voltage; and a starting circuit including a conductor connected directly between the input of said network and the loop circuit whereby intermittent surges of ringing current present in the loop circuit are likewise present in said network, are rectified thereby, and are applied to bias the first tube to produce an initial cathodic output sufficient for energization of the winding.

2. In a loudspeaking telephone the combination, with a telephone loop circuit, a signal current transmission channel, a transmitting amplifier coupled to the loop circuit by said channel, and a receiving amplifier also connected by said channel to the loop circuit and including, incident to its amplification function, vacuum tube means responding to the presence of signal current in the receiving channel to produce an alternating control current, of: control apparatus responsive to changes in circuit conditions and operating automatically to, in sequence, close said channel as a result of the impression of ringing current upon the loop circuit when the telephone is called, keep the channel closed in the presence of signal current in the loop circuit and receiving amplifier, and then open the channel upon the lapse of a predetermined time delay following the cessation of signal current in said loop circuit and receiving amplifier, said apparatus comprising rectifying and condensing means mounted in circuit with said vacuum tube means in the form of a network in which said alternating current is changed to direct current by the rectifying means and is stored as a function of the condensing means; an on-off control relay including a normally deenergized winding, normally open first contacts, and normally closed second contacts; a relay control tube including a grid having a connection to said network such that the tube is biased, and is thereafter maintained under bias as a consequence of the storage function of said network for a predetermined period of time following cessation of said alternating current, said tube having its cathode connected to the winding of the relay in driving relation thereto, whereby said tube in response to its initial bias and to the maintenance of said bias will energize the winding and will thereafter hold the same energized until lapse of said time period occurs, said first contacts being connected in the channel of signal transmission and being closed when the relay is energized to open the transmission channel to the flow of signal current therethrough; and a starting circuit providing a connection between said network and the loop circuit such that intermittent alternating current surges of ringing current present in the loop circuit are likewise present in said network, are rectified to direct current thereby, and are applied to bias the control tube, said second set of contacts being connected in the starting circuit and being opened when the relay is energized, thus to terminate said ringing current simultaneously with the establishment of signal current in the loop circuit, transmission channel, and amplifiers.

3. Apparatus as in claim 2 wherein said vacuum tube means includes an amplifying tube having a plate at which said alternating current is produced, said apparatus including a lead extending from the plate to the rectifying and storage network to provide a carrier for said alternating current, said starting circuit extending to a juncture with said lead and continuing in common therewith from said juncture to said network; and a blocking condenser provided in said lead between the vacuum tube means and said juncture of the lead with the starting circuit for filtering direct current components from said control current.

4. Apparatus as in claim 2 further including a shunt extending across said signal transmission channel between the loop circuit and amplifiers, said shunt including a lead connected at opposite ends thereof to the incoming and outgoing lines of the channel, a pair of resistors, one of which is variable, connected in series in said last named lead, and a condenser in shunt with the other resistor.

5. Apparatus as in claim 2 wherein said network includes a first lead providing a common connection of the network to one side of the starting circuit and to the vacuum tube means, a condenser and a resistor in series in said first lead, said lead extending from said common connection to the control tube, a second lead extending from the first lead to a connection with ground, a second condenser in said second lead, a third lead extending from the second lead to a juncture with the other side of the starting circuit, a fourth lead connected between the first lead and said juncture with the other side of the starting circuit, a rectifier in said fourth lead, a second resistor connected between the first lead and said juncture with the other side of the circuit, and a third condenser in the path of flow of current through said other side of the starting circuit.

6. In a loudspeaking telephone the combination, with a telephone loop circuit, a signal current transmission channel, a transmitting amplifier coupled to the loop circuit by said channel, and a receiving amplifier also connected by said channel to the loop circuit and including, incident to its amplification function, vacuum tube means responding to the presence of signal current in the receiving channel to produce an alternating control current, of: control apparatus responsive to changes in circuit conditions and operating automatically to, in sequence, close said channel as a result of the impression of ringing current upon the loop circuit when the telephone is called, keep the channel closed in the presence of signal current in the loop circuit and receiving amplifier, and then open the channel, said apparatus comprising rectifying means mounted in circuit with the vacuum tube means in the form of a network in which said alternating current is changed to direct current by the rectifying means; an on-off control relay including a normally deenergized winding, normally open first contacts, and normally closed second contacts; a relay control tube including a grid having a connection to said network such that the tube is biased by the rectified current passing through said network, said tube having its cathode connected to the winding of the relay in driving relation thereto, whereby said tube when biased will energize the winding, said first contacts being connected in the channel of signal transmission and being closed when the relay is energized to open the transmission channel to the flow of signal current therethrough; and a starting circuit providing a connection between said network and the loop circuit such that intermittent alternating current surges of ringing current present in the loop circuit are likewise present in said network, are rectified to direct current thereby, and are applied to bias the control tube, said second set of contacts being connected in the starting circuit and being opened when the relay is energized, thus to terminate said ringing current simultaneously with the establishment of signal current in the loop circuit, transmission channel, and amplifiers.

7. In a loudspeaking telephone the combination, with a telephone loop circuit, a signal current transmission channel, a transmitting amplifier coupled to the loop circuit by said channel, and a receiving amplifier also connected by said channel to the loop circuit and including, incident to its amplification function, vacuum tube means responding to the presence of signal current in the receiving channel to produce an alternating control current, of: control apparatus responsive to changes in circuit conditions and operating automatically to, in sequence, close said channel as a result of the impression of ringing current upon the loop circuit when the telephone is called, keep the channel closed in the presence of signal current in the loop circuit and receiving amplifier, and then open the channel, said apparatus comprising an on-off control relay including a normally deenergized winding, normally open first contacts, and normally closed second contacts; a relay control tube including a grid having a conductive coupling to the vacuum tube means such that the tube is biased in consequence of the production of said control current by the vacuum tube means, said tube having its cathode connected to the winding of the relay in driving relation thereto, whereby said tube, in response to its initial bias, will energize the winding, said first contacts being connected in the channel of signal transmission and being closed when the relay is energized to open the transmission channel to the flow of the signal current therethrough; and a starting circuit providing a connection between said network and the loop circuit such that intermittent alternating current surges of ringing curent present in the loop circuit are likewise present in said network, are rectified to direct current thereby, and are applied to bias the control tube, said second set of contacts being connected in the starting circuit and being opened when the relay is energized, thus to terminate said ringing current simultaneously with the establishment of signal current in the loop circuit, transmission channel, and amplifiers.

References Cited in the file of this patent

UNITED STATES PATENTS

| | | |
|---|---|---|
| 2,129,990 | Fremery | Sept. 13, 1938 |
| 2,369,460 | Herrick | Feb. 13, 1945 |
| 2,826,636 | Beatty | Mar. 11, 1958 |

FOREIGN PATENTS

| | | |
|---|---|---|
| 635,564 | Germany | Sept. 28, 1936 |